United States Patent
Stolin Roditi et al.

(10) Patent No.: US 9,122,206 B2
(45) Date of Patent: Sep. 1, 2015

(54) LIQUID TONER COMPOSITION

(75) Inventors: Stella Stolin Roditi, Nes Ziona (IL); Fernanda Orlik, Nes Ziona (IL); Haim Cohen, Nes Ziona (IL); Albert Teishev, Nes Ziona (IL); Nava Klein, Nes Ziona (IL)

(73) Assignee: HEWLETT-PACKARD INDIGO B.V., Amstelveen (NL)

( * ) Notice: Subject to any disclaimer, the term of this patent is extended or adjusted under 35 U.S.C. 154(b) by 0 days.

(21) Appl. No.: 14/009,100

(22) PCT Filed: Mar. 30, 2011

(86) PCT No.: PCT/EP2011/054947
§ 371 (c)(1),
(2), (4) Date: Sep. 30, 2013

(87) PCT Pub. No.: WO2012/130303
PCT Pub. Date: Oct. 4, 2012

(65) Prior Publication Data
US 2014/0030651 A1    Jan. 30, 2014

(51) Int. Cl.
| | |
|---|---|
| *G03G 9/13* | (2006.01) |
| *G03G 13/10* | (2006.01) |
| *G03G 13/16* | (2006.01) |
| *C09D 11/02* | (2014.01) |
| *C09D 11/107* | (2014.01) |
| *C09D 11/52* | (2014.01) |
| *G03G 9/125* | (2006.01) |

(52) U.S. Cl.
CPC .............. *G03G 13/16* (2013.01); *C09D 11/02* (2013.01); *C09D 11/107* (2013.01); *C09D 11/52* (2013.01); *G03G 9/125* (2013.01); *G03G 9/131* (2013.01); *G03G 13/10* (2013.01)

(58) Field of Classification Search
CPC ........ G03G 9/131; G03G 13/10; G03G 13/16
USPC .................. 430/114, 119.1, 137.22
See application file for complete search history.

(56) References Cited

U.S. PATENT DOCUMENTS

| | | | |
|---|---|---|---|
| 4,794,651 A | 12/1988 | Landa et al. | |
| 5,225,306 A | 7/1993 | Almog et al. | |
| 5,240,806 A | 8/1993 | Tang et al. | |
| 5,264,313 A | 11/1993 | Landa et al. | |
| 5,266,435 A | 11/1993 | Almog | |
| 5,286,593 A | 2/1994 | Landa et al. | |
| 5,346,796 A | 9/1994 | Almog | |
| 5,596,396 A | 1/1997 | Landa et al. | |
| 5,672,457 A | 9/1997 | Gibson et al. | |
| 5,679,492 A | 10/1997 | Chamberlain et al. | |
| 5,700,516 A * | 12/1997 | Sandvick et al. | 427/155 |
| 5,728,502 A * | 3/1998 | Ou-Yang et al. | 430/117.4 |
| 5,737,666 A | 4/1998 | Lior et al. | |
| 5,942,365 A | 8/1999 | Gibson et al. | |
| 6,623,902 B1 * | 9/2003 | Ben-Avraham et al. | 430/114 |
| 7,544,458 B2 | 6/2009 | Iraqi et al. | |
| 7,736,829 B2 | 6/2010 | Silcoff et al. | |
| 2005/0221209 A1 * | 10/2005 | Golodetz et al. | 430/45 |
| 2006/0194138 A1 | 8/2006 | Regev et al. | |
| 2007/0105034 A1 * | 5/2007 | Chatow et al. | 430/114 |
| 2008/0163788 A1 | 7/2008 | Silcoff et al. | |
| 2008/0163789 A1 | 7/2008 | Silcoff et al. | |
| 2008/0248405 A1 | 10/2008 | Almanza-Workman et al. | |
| 2009/0311614 A1 | 12/2009 | Almog et al. | |
| 2010/0103437 A1 | 4/2010 | Li | |

FOREIGN PATENT DOCUMENTS

| | | |
|---|---|---|
| CN | 102056999 | 5/2011 |
| EP | 0406518 | 1/1991 |
| EP | 1425631 | 6/2004 |
| EP | 1494086 | 1/2005 |
| JP | 2005084258 | 3/2005 |
| WO | 9928791 | 6/1999 |
| WO | 03009064 | 1/2003 |
| WO | 03065126 | 8/2003 |
| WO | 2005054959 | 6/2005 |
| WO | 2006044106 | 4/2006 |
| WO | 2007054467 | 5/2007 |
| WO | 2007130069 | 11/2007 |
| WO | 2009014855 | 1/2009 |
| WO | 2009096922 | 8/2009 |
| WO | 2009151446 | 12/2009 |
| WO | 2010042111 | 4/2010 |
| WO | 2010053480 | 5/2010 |

OTHER PUBLICATIONS

USPTO Trademark Electronic Search Sytem (TESS) printout of Sep. 22, 2014, describing the Trademark LOTADER, Serial No. 74581917.*
American Chemical Society (ACS) File Registry Number No. 41171-14-6 on STN, copyright 2014, which was entered in Nov. 16, 1984.*
Arkema LOTADER 8200 Material property datasheet [online], MatWeb, LLC., copyright 1996-2014 [retrieved on Sep. 18, 2014]. Retrieved from Internet: <URL:http://www.matweb.com/search/datasheet.aspx?matguid=c9b96dedebd54fe28356217ca6ed1e16&ckck=1>.*
DuPont Product Data Sheet describing BYNEL 2002 [online], E.I. du Pont de Nemours and Company, Inc., effective Aug. 7, 2010, [retrieved on Sep. 23, 2014] Retrieved from Internet: <URL:http://www.dupont.com/content/dam/assets/products-and-services/packaging-materials-solutions/assets/bynel 2002.pdf>.*

(Continued)

*Primary Examiner* — Janis L Dote
(74) *Attorney, Agent, or Firm* — Hewlett-Packard Patent Department

(57) ABSTRACT

The present disclosure is drawn to a liquid toner composition comprising:
(a) a carrier liquid;
(b) particles comprising
  (i) a first component comprising a polymer having acidic side groups; and
  (ii) a second component comprising a polymer having ester side groups; and
(c) a charge director. Also described herein are a method of producing a liquid toner composition and a method of electrophotographic printing using a liquid toner composition.

26 Claims, 1 Drawing Sheet

(56) References Cited

OTHER PUBLICATIONS

American Chemical Society (ACS) File Registry Number No. 52255-41-1 on STN, copyright 2014, which was entered in Nov. 16, 1984.*

American Chemical Society (ACS) File Registry Number No. 37433-35-5 on STN, copyright 2014, which was entered in Nov. 16, 1984.*

DuPont Product Data Sheet describing BYNEL 2022 [online], E.I. du Pont de Nemours and Company, Inc., effective Aug. 7, 2010, [retrieved on Sep. 23, 2014] Retrieved from Internet: <URL: http://www.dupont.com/content/dam/assets/products-and-services/packaging-materials-solutions/assets/bynel 2022.pdf>.*

Honeywell Product Information Sheet describing A-C 5180 [online], Honeywell International Inc., copyright 2004-2012 [retrieved on Sep. 23, 2014] Retrieved from Internet: <URL: http://www.honeywelladditives.com/Additives/Pages/ViewProduct.aspx?pid=31>.*

Whelan, Tony, Consultant, Polymer Technology Dictionary, Chapman & Hall, London (1994), p. 12.*

Koenig, Karl E., "Structural Analysis of Ethylene-Maleic Anhydride Copolymer, Ammoniated Ethylene-Maleic Anhydride Copolymer, and Caboxyimamidate by 13 C and 1H NMR," Macromolecules, vol. 16. No. 1, (1983), pp. 99-105.*

* cited by examiner

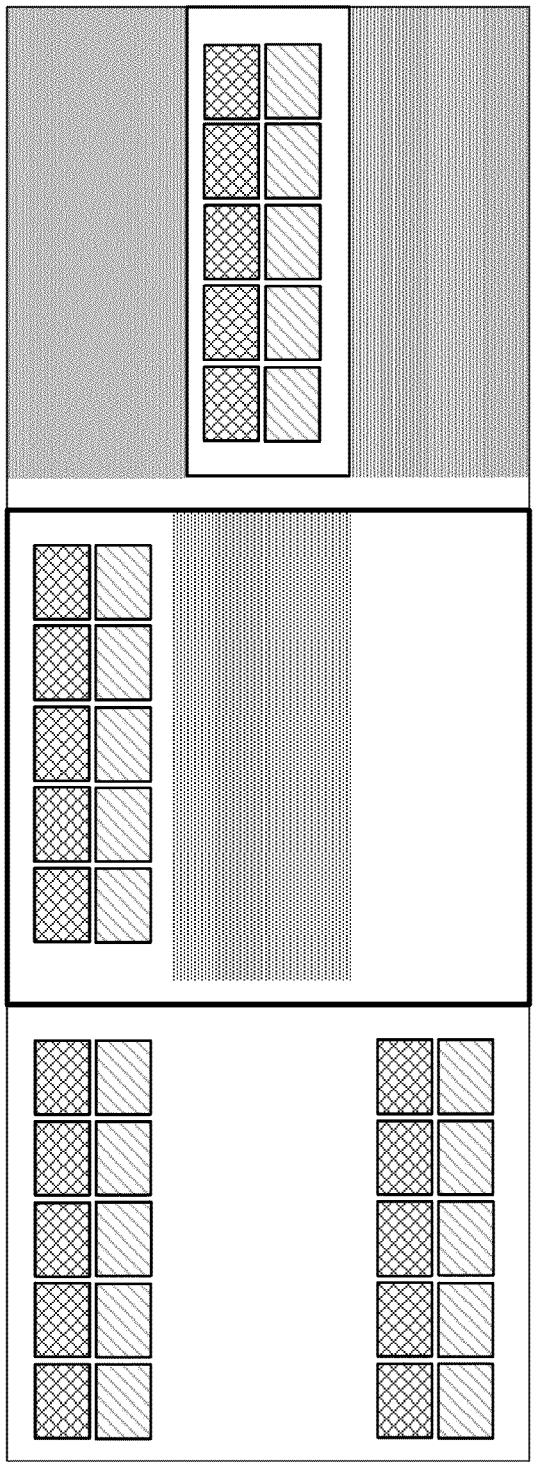

LIQUID TONER COMPOSITION

BACKGROUND

Liquid toner compositions for use in electrostatic printing typically contain resin particles within a carrier liquid. In recent years, there has been a trend toward using resins that are more durable when printed. The present inventors have been investigating certain resins, particularly those with a higher acidity than those typically used in the prior art, in an effort to improve the durability of the inks once printed. Certain resins have been found to be particularly effective in producing a durable ink, but the present inventors have identified certain difficulties associated with them, for example in the electrostatic printing processes. Electrostatic printing will briefly be described.

In electrostatic printing systems, it is common practice to develop a hardcopy of an image by using a photoconductive surface. The photoconductive surface is typically on a cylinder and is often termed a photo imaging plate (PIP). The photoconductive surface is selectively charged with a latent electrostatic image having image and background areas. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to a heated intermediate transfer member (often a flexible member, sometimes termed a blanket), and then to the print substrate. Variations of this method utilize different ways for forming the electrostatic latent image on a photoreceptor or on a dielectric material.

Typically, an electrostatic ink composition comprises a thermoplastic resin as the basis for the toner particles, and a non-polar liquid as a carrier liquid in which the toner particles are dispersed. Generally, the toner particles contain a colorant such as a pigment. A charge director, also called charge control agent or imaging agent, is also added to the dispersion to induce charge on the particles.

The present inventors have found that with certain resins, particularly those with a relatively high acidity (particularly an acidity of 80 mg KOH/g or more, especially an acidity of 100 mg KOH/g or more), the toner particles do not transfer as effectively as desired from the imaging plate to the intermediate transfer member, and then from the intermediate transfer member to a print substrate, such as paper.

It would be desirable to provide a liquid toner composition that avoids or mitigates at least one of the transfer problems associated with the toner compositions described above. It would also be desirable to provide a liquid toner composition that produces a durable ink once printed, while also avoiding or mitigating at least one of transfer problems associated with the toner compositions mentioned above.

BRIEF DESCRIPTION OF THE FIGURES

FIG. 1 shows the three printing patterns used in the test carried out to determine the ink transfer from the intermediate transfer member (the blanket) to the paper.

DETAILED DESCRIPTION

Before the present invention is further disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the context clearly dictates otherwise.

As used herein, "carrier liquid," "carrier," or "carrier vehicle" refers to the fluid in which the polymers, particles, colorant, charge directors and other additives can be dispersed to form a liquid electrophotographic ink or liquid electrostatic ink composition. Such carrier liquids and vehicle components are known in the art. Typical carrier liquids can include a mixture of a variety of different agents, such as surfactants, co-solvents, viscosity modifiers, and/or other possible ingredients.

As used herein, "liquid toner composition" generally refers to a toner composition in liquid form that is typically suitable for use in an electrophotographic or electrostatic printing process.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g., 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the liquid toner composition.

As used herein, "acidity," "acid number," or "acid value" refers to the mass of potassium hydroxide (KOH) in milligrams that is required to neutralize one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 1400 C. The units can be given in mPa-s or poise, as known in the art. Alternatively, a parallel plate rheometer can be used, such as a commercially available AR-2000 Rheometer from Thermal Analysis Instruments. If the melt viscosity of a particular polymer is specified, unless otherwise stated, it is the melt viscosity for that polymer alone, in the absence of any of the other components of the liquid toner composition.

A certain monomer may be described herein as constituting a certain weight percentage of a polymer. This indicates that the repeating units formed from the said monomer in the polymer constitute said weight percentage of the polymer.

As used herein, "incompatible wax" refers to a wax that is incompatible with the polymer blend. Specifically, the wax phase separates from the polymer blend phase upon the cooling of the polymer fused mixture on the substrate during and after the transfer of the ink film from the blanket.

As used herein, "electrophotographic printing" or "electrostatic printing" generally refers to the process that provides an image that is transferred from a photo imaging substrate either directly or indirectly via an intermediate transfer member. As such, the image is not substantially absorbed into the photo imaging substrate on which it is applied. Additionally, "electrophotographic printers" or "electrostatic printers" generally refer to those printers capable of performing electrophotographic printing, as described above. "Liquid electrophotographic printing" or "liquid electrostatic printing" is a specific type of electrophotographic printing where a liquid ink is employed in the electrophotographic process rather than a powder toner.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

In a first aspect, the present invention provides a liquid toner composition comprising:
(a) a carrier liquid;
(b) particles comprising
(i) a first component comprising a polymer having acidic side groups; and
(ii) a second component comprising a polymer having ester side groups; and
(c) a charge director. In an embodiment, the liquid toner composition is suitable for use in an electrophotographic printing method.

In a second aspect, the present invention provides a method of producing a liquid toner composition, the method comprising:
combining a carrier liquid, a first component comprising a polymer having acidic side groups, a second component comprising a polymer having ester side groups and a charge director such that the liquid toner composition of the first aspect is formed.

In a third aspect, the present invention provides a method of electrophotographic printing using a liquid toner composition of the first aspect, the method comprising:
forming a latent electrostatic image on a surface;
contacting the surface with the toner composition of the first aspect, such that at least some of the particles adhere to the surface to form a developed toner image on the surface, and transferring the toner image to a substrate.

Embodiments of the liquid toner composition have been found to have improved transfer properties in electrostatic printing processes compared to liquid toner compositions that contain similar polymers having acidic side groups but which do not contain a polymer having ester side groups. The inks printed using the toner compositions as described herein also display acceptable durability, often comparable to similar toner compositions containing acidic resins, but absent a polymer having ester side groups. While not being bound by theory, it is believed by the present inventors that the esterified polymers absorb at least some of the carrier liquid and improve the flow properties of the toner particles, for example in the process in which the toner particles are transferred to a photoconductive surface, and then to an intermediate transfer member, and from the intermediate transfer member to a print substrate, such as paper. Some swelling data for esterified polymers (e.g. Bynel® 2002 and Bynel® 2022 polymers) compared to non-esterified polymers are given in the examples below.

The first component comprises a polymer having acidic side groups. The polymer having acidic side groups is preferably a thermoplastic polymer. The polymer, or polymers if more than one polymer is present, of the first component may be absent of ester side groups. The polymer having acidic side groups may have an acidity of 50 mg KOH/g or more, optionally an acidity of 60 mg KOH/g or more, optionally an acidity of 70 mg KOH/g or more, optionally an acidity of 80 mg KOH/g or more, optionally an acidity of 90 mg KOH/g or more, optionally an acidity of 100 mg KOH/g or more, optionally an acidity of 105 mg KOH/g or more, optionally 110 mg KOH/g or more, optionally 115 mg KOH/g or more. The polymer having acidic side groups may have an acidity of 130 mg KOH/g or less, optionally 120 mg KOH/g or less. The acidity of a polymer, as measured in mg KOH/g, can be measured using standard procedures known in the art, for example using the procedure described in ASTM D1386 or the test method described in the Examples below.

The polymer having acidic side groups may have a melt flow rate of less than about 60 g/10 minutes, optionally about 50 g/10 minutes or less, optionally about 40 g/10 minutes or less, optionally 30 g/10 minutes or less, optionally 20 g/10 minutes or less, optionally 10 g/10 minutes or less.

The polymer having acidic side groups can have a melt flow rate of about 10 g/10 minutes to about 120 g/10 minutes, optionally about 10 g/10 minutes to about 50 g/10 minutes, optionally about 50 g/10 minutes to about 120 g/10 minutes.

The melt flow rate can be measured using standard procedures known in the art, for example as described in ASTM D1238.

The polymer having acidic sides groups can be selected from resins such as copolymers of ethylene and an ethylenically unsaturated acid of either acrylic acid and methacrylic acid and ethylene-acrylic or methacrylic acid copolymers which are partially neutralized with metal ions (e.g. Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitutes from 5 wt % to about 25 wt % of the copolymer, optionally from 10 wt % to about 20 wt % of the copolymer.

In one embodiment, the polymer having acidic side groups can be selected from copolymers of ethylene and an ethylenically unsaturated acid of either acrylic or methacrylic acid; an ionomer of ethylene methacrylic acid copolymer; and an ionomer of ethylene acrylic acid copolymer. In one embodiment, the first component can comprises a NUCREL® polymer selected from NUCREL® 925, NUCREL® 2906, NUCREL® 2806, NUCREL® 960, NUCREL® 699, NUCREL® 599, and mixtures thereof.

The first component may comprise two different polymers having acidic side groups. The two polymers having acidic side groups may have different acidities, which may fall within the ranges mentioned above. The first component may comprise a first polymer having acidic side groups that has an acidity of from 50 mg KOH/g to 110 mg KOH/g and a second polymer having acid side groups that has an acidity of more than 110 mg KOH/g to 130 mg KOH/g.

The first component may comprise two different polymers having acidic side groups: a first polymer having acidic side groups that has a melt flow rate of about 10 g/10 minutes to about 50 g/10 minutes, and a second polymer having acidic side groups that has a melt flow rate of about 50 g/10 minutes to about 120 g/10 minutes.

The first component may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

In one embodiment, the ratio of the first polymer having acidic side groups to the second polymer having acidic side groups can be from about 10:1 to about 2:1. In another embodiment, the ratio can be from about 6:1 to about 3:1, optionally about 4:1.

The first component may comprise two different polymers having acidic side groups that are selected from copolymers of ethylene and an ethylenically unsaturated acid of either acrylic acid and methacrylic acid and ethylene-acrylic or methacrylic acid copolymers which are partially neutralized with metal ions (e.g. Zn, Na, Li) such as SURLYN® ionomers. The first component may comprise (i) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer, optionally 10 wt % to 16 wt % of the copolymer; and (ii) a second polymer that is a copolymer of ethylene and an ethylenically unsaturated acid of either acrylic acid or methacrylic acid, wherein the ethylenically unsaturated acid of either acrylic or methacrylic acid constitutes from 16 wt % to about 20 wt % of the copolymer, optionally from 17 wt % to 19 wt % of the copolymer.

The polymer having ester side groups is preferably a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, optionally 1 to 20 carbons, optionally 1 to 10 carbons; optionally selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, optionally an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, optionally 5 to 40% by weight, optionally 5 to 20% by weight of the copolymer, optionally 5 to 15% by weight of the copolymer. The second monomer may constitute 1 to 50% by weight of the co-polymer, optionally 5 to 40% by weight of the co-polymer, optionally 5 to 20% by weight of the copolymer, optionally 5 to 15% by weight of the copolymer. In an embodiment, the first monomer constitutes 5 to 40% by weight of the co-polymer, the second monomer constitutes 5 to 40% by weight of the co-polymer, and with the third monomer constituting the remaining weight of the copolymer. In an embodiment, the first monomer constitutes 5 to 15% by weight of the co-polymer, the second monomer constitutes 5 to 15% by weight of the co-polymer, with the third monomer constituting the remaining weight of the copolymer. In an embodiment, the first monomer constitutes 8 to 12% by weight of the co-polymer, the second monomer constitutes 8 to 12% by weight of the co-polymer, with the third monomer constituting the remaining weight of the copolymer. In an embodiment, the first monomer constitutes about 10% by weight of the co-polymer, the second monomer constitutes about 10% by weight of the co-polymer, and with the third monomer constituting the remaining weight of the copolymer. The polymer may be selected from the Bynel® class of monomer, including Bynel® 2022 and Bynel® 2002, which are available from DuPont®.

The polymer having ester side groups may have an acidity of 50 mg KOH/g or more, optionally an acidity of 60 mg KOH/g or more, optionally an acidity of 70 mg KOH/g or more, optionally an acidity of 80 mg KOH/g or more. The polymer having ester side groups may have an acidity of 100 mg KOH/g or less, optionally 90 mg KOH/g or less. The polymer having ester side groups may have an acidity of 60 mg KOH/g to 90 mg KOH/g, optionally 70 mg KOH/g to 80 mg KOH/g.

The polymer having ester side groups may have a melt flow rate of about 10 g/10 minutes to about 120 g/10 minutes, optionally about 10 g/10 minutes to about 50 g/10 minutes, optionally about 20 g/10 minutes to about 40 g/10 minutes, optionally about 25 g/10 minutes to about 35 g/10 minutes.

The polymer having ester side groups may absorb more of the carrier liquid than the polymer or polymers of the first component having acidic side groups, under the same conditions. In this context, the conditions may be placing a sample of the polymer in the carrier liquid, in the absence of any of the other components of the toner composition, at a temperatures of 45° C. for a period of 7 days; the dimensions of the polymer having ester side groups and the polymer of the first component having acidic side groups, at the start of the test should be the same. The carrier liquid may, for example, be an isoparaffin, such as a paraffin from the ISOPAR series. In an embodiment, the polymer having ester side groups may absorb 25% or more of its weight when placed in the carrier liquid, optionally 30% or more, optionally 35% or more, optionally 37% or more or more of its weight when placed in the carrier liquid, e.g. under the conditions mentioned above.

The polymers of the first and second components may together form a mixture (excluding any other components of the liquid toner composition) that has a melt viscosity of 6000 poise or more, optionally a melt viscosity of 8000 poise or more, optionally a melt viscosity of 10000 poise or more, optionally a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

Optionally, all polymers of the first and second components each individually have a melt flow rate of less than 90 g/10 minutes, 80 g/10 minutes or less, optionally 80 g/10 minutes or less, optionally 70 g/10 minutes or less, optionally 70 g/10 minutes or less, optionally 60 g/10 minutes or less.

The polymer having ester side groups may constitute 1% or more by weight of the total amount of the polymers of the first and second components, i.e. the total amount of the polymer or polymers having acidic side groups and polymer having ester side groups. The polymer having ester side groups may constitute 5% or more by weight of the total amount of the polymers of the first and second components, optionally 8% or more by weight of the total amount of the polymers of the first and second components, optionally 10% or more by weight of the total amount of the polymers of the first and second components, optionally 15% or more by weight of the total amount of the polymers of the first and second components, optionally 20% or more by weight of the total amount of the polymers of the first and second components, optionally 25% or more by weight of the total amount of the polymers of the first and second component, optionally 30% or more by weight of the total amount of the polymers of the first and second component, optionally 35% or more by weight of the total amount of the polymers of the first and second component. The polymer having ester side groups may constitute from 5% to 50% by weight of the total amount of the polymers of the first and second components, optionally 10% to 40% by weight of the total amount of the polymers of the first and second components, optionally 15% to 30% by weight of the total amount of the polymers of the first and second components.

The polymers of the first and second components may together constitute 5% to 99% by weight of the solids in the liquid toner composition, optionally 50% to 90% by weight of the solids of the liquid toner composition, optionally 70% to 90% by weight of the solids of the liquid toner composition. The polymers of the first and second components may form a homogenous mixture within the particles. Generally, the carrier liquid acts as a dispersing medium for the other components in the liquid electrophotographic ink. For example, the carrier liquid can comprises or be a hydrocarbon, silicone oil, vegetable oil, etc. As such, the carrier liquid can comprises or be a hydrocarbon-based carrier. Generally, the carrier liquids used for the inks of the present disclosure can be substantially similar to carriers used in prior art liquid electrophotography inks. Generally such inks include at least one aliphatic hydrocarbon, such as paraffins and isoparaffins. As such, carrier liquids can comprise, or substantially comprise, or even essentially consist of isoparaffins, such as or equivalent to the ISOPAR® high-purity isoparaffinic solvents with narrow boiling ranges marketed by Exxon Mobil Corporation (Fairfax, Va., USA). Also suitable as carrier liquids or components of carrier liquids for implementing embodiments of the present disclosure are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as carrier liquids or vehicle components are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such carrier liquids and vehicle components have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity. The carrier liquid may constitute 50 to 99.5% of the liquid toner composition, optionally 80 to 99.5% of the liquid toner composition, optionally 90 to 99% of the liquid toner composition.

The liquid toner composition may comprise a pigment. The toner particles of the liquid toner composition may comprise a pigment. The pigments dispersed in the carrier liquid can be any pigment compatible with the carrier liquid and useful for electrophotographic or electrostatic printing. For example, the pigment may be present as pigment particles, or may comprise a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The charge director is added to the carrier liquid in order to maintain sufficient electrostatic charge on the ink particles. For example, the charge components can be nanoparticles of a simple salt and a sulfosuccinate salt of the general formula $MA_n$, wherein M is a metal, n is the valence of M, and A is an ion of the general formula $[R_1—O—C(O)CH_2CH(SO_3^-)OC(O)—O—R_2]$, where each of $R_1$ and $R_2$ is an alkyl group, or other charge component as found in WO2007130069. Additionally, charge director compounds include ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director used herein can be any as known in the art such as described in U.S. Pat. No. 5,346,796, which is incorporated herein by reference in its entirety.

The liquid toner composition may comprise one or more additives, for example an additive selected from a charge adjuvant, a wax, a surfactant, biocides, organic solvents, viscosity modifiers, materials for pH adjustment, sequestering agents, preservatives, compatibility additives, emulsifiers and the like. The wax may be an incompatible wax.

In an embodiment, the liquid toner composition can include a charge adjuvant. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an embodiment, the charge adjuvant is aluminum tristearate. The charge adjuvant may be present in an amount of about 0.1 to 5, about 0.5 to 4, and about 1 to 3% weight of the liquid toner composition.

The present invention provides a method of producing a liquid toner composition, the method comprising:

combining a carrier liquid, a first component comprising a polymer having acidic side groups, a second component comprising a polymer having ester side groups and a charge director such that the liquid toner composition of the first aspect is formed. The method can comprise mixing the first component, second component and the carrier liquid under appropriate conditions, optionally in the present of a pigment, to form particles comprising the first and second components, and optionally the pigment, within the carrier liquid, and mixing the charge director with the carrier liquid. One or more further additives as described herein may be added at any time during the method. The steps described above are not intended to be bound by any particular order. For example, the mixing of the first and second components with the carrier liquid may be performed before, after, or concurrently with the step of combining the synthetic charge director system with the carrier liquid. Additionally, the steps may be combined or performed in a different order as is known in the art. Additionally, the steps may include other necessary processing steps as is known in the art. For example, the step of combining the colorant with the binder composition can include grinding the first and second components and, optionally, the pigment if present.

In a third aspect, the present invention provides a method of electrophotographic printing using a liquid toner composition of the first aspect, the method comprising:

forming a latent electrostatic image on a surface;

contacting the surface with the toner composition of the first aspect, such that at least some of the particles adhere to the surface to form a developed toner image on the surface, and transferring the toner image to a print substrate, optionally via an intermediate transfer member.

The surface on which the latent electrostatic image is formed may be on a rotating member, e.g. in the form of a cylinder. The surface on which the latent electrostatic image is formed may form part of a photo imaging plate (PIP). The intermediate transfer member may be a rotating flexible member, which is optionally heated, e.g. to a temperature of from 80 to 130° C. The print substrate is optionally a cellulosic print substrate such as paper. The cellulosic print substrate is optionally an uncoated cellulosic print substrate, i.e. absent of a coating of a polymeric material. The print substrate may be an acrylic print substrate, optionally a coated acrylic print substrate, e.g. coated with a styrene-butadiene co-polymer.

EXAMPLES

The following examples illustrate embodiments of the disclosure that are presently known. Thus, these examples should not be considered as limitations of the present disclosure, but are merely in place to teach how to make compositions of the present disclosure. As such, a representative number of compositions and their method of manufacture are disclosed herein.

Measuring the Acidity of a Polymer

Described below is a method for measuring the acidity (or acid number of a polymer) using the techniques described in ASTM D1386:

Test sample of the polymer (0.3-0.6 g) was weighed (to the nearest mg) into a 250-mL conical flask (24/40 TS joint). To the sample in the flask, a magnetic stirring bar was added along with 50 mL of mixed xylenes and a condenser attached to the flask. The sample was heated to reflux and stirred on a hot plate for ½ hour to dissolve the test sample.

The flask was moved to a stirring hot plate (surface temperature 210° C.), the condenser removed and the walls of the flask were washed down with about 15-20 mL of IPA. About 5 drops of 1% phenolphthalein (in ethanol) was added and the solution was stirred until the any precipitated indicator had re-dissolved. If needed a little more IPA was added. The solutions was titrated to end point with standard 0.1N ethanolic KOH. At the end point, titrant was added in 0.05 mL increments. The titration was performed with a Metrohm model 776 Dosimat and a 10-ml buret.

Properties of Some Polymers that can be use in Embodiments of the Present Invention

TABLE A

| DuPont ® trade name of polymer | Acidity of polymer, (mg KOH/g) (using version of ASTM D1386) | nominal % acid (w/w), i.e. wt % of acrylic acid or methacrylic acid used to form the co-polymer | MFR ASTM D1238 g/min |
|---|---|---|---|
| Nucrel ® 925 | 105 | 15% | 25 |
| Bynel ® 2022 | 74 | 10% | 30 |
| Nucrel ® 699 | 76 | 10% | 95 |
| Nucrel ® 2806 | 115 | 18% | 60 |
| Nucrel ® 960 | 105 | 15% | 60 |
| Nucrel ® 2940 | 124 | 18% | 395 |

Swelling Properties of Polymers that can be used in Embodiments of the Present Invention The present inventors carried out some tests on the propensity of certain polymers to swell when contacted with a hydrocarbon liquid (in particular Isopar-L). The test method is as follows:

First, films of the polymers to be tested are produced by melting at 150° C. for 60 minutes in an oven on a release plate. Each polymer film is cut into three 3×1×0.5 cm³ rectangular pieces and weighed. Each piece is immersed into 10 ml of Isopar-L hydrocarbon oil, for seven days at 45° C. Polymer film pieces are removed from the immersion liquid, gently wiped with a fiberless rag and reweighed. Percentage of weight thus gained is reported as Swelling % in table B below.

TABLE B

| Resin | Swelling % (w/w) |
|---|---|
| Nucrel ® 925 | 23 |
| Nucrel ® 2806 | 24 |
| Bynel ® 2022 | 39 |
| Bynel ® 2002 | 39 |
| Nucrel ® 699 | 23 |
| Nucrel ® 960 | 22 |
| A-C ® 5120 | 55 |

Production of Toner Particles

Four types of toner particles were produced:

Type A, which included the resins Nucrel® 925 and Nucrel® 2806 in the weight proportions 70:30;

Type B, which included the resins Nucrel® 925, Nucrel® 2806 and Bynel® 2022 in the weight proportions 72:18:10; and Type C, which included the resins Nucrel® 925, Nucrel® 2806 and Bynel® 2022 in the weight proportions 56:24:20.

Type D, which included the resins Nucrel® 925, Nucrel® 2806 and Bynel® 2022 in the weight proportions 42:18:40

Type A is a comparative example. Type B, C and D are examples of embodiments according to the present invention.

The general procedure for producing the resin particles is described below.

As a first step, all resins as listed above for Type A, Type B, Type C or Type D toner particles were mixed in a Ross double planetary mixer with 1500 grams of Isopar™ L (an isoparfinic oil manufactured by EXXON) carrier liquid at a speed of 60 rpm and a temperature of 130° C. for one hour. The total amount of resins in each case was 1000 g. The temperature is then reduced and mixing is continued until the mixture reaches room temperature. During mixing the polymer solvates the Isopar™ isoparaffinic oil and during the cooling granules of polymer (with solvated carrier liquid) in carrier liquid are produced.

As a second step, 1000 grams of the mixture produced in the first step is charged into a Union Process 1S ball atritor together with 5 grams of aluminum tri-stearate (Riedel de-Haan) as a charge adjuvant and 92 grams of the pigment Monarch® 800 (available from CABOT), and Alkali Blau D 6200 from BASF at a ratio of 15 to 3 respectively. The mixture is ground for 2 hours at 55° C. followed by grinding for 10 hours at 40° C. until a toner concentrate having toner particles incorporating the adjuvant and pigments is produced.

Preparation of the Liquid Toner Composition

The toner concentrate made above containing Type A, Type B, Type C or Type D particles is charged utilizing 10 mg/g of charge director and diluted with additional Isopar™ L isoparaffinic oil to produce a toner having a 2% NVS, with 98% of the carrier liquid being Isopar™ L isoparaffinic oil. The charge director was a barium bis sulfosuccinate salt, as described in US 2009/0311614. Other charge directors as known in the art can also be used. Wax particles suspended in Isopar™-L isoparaffinic oil in a weight percentage of 4.5% with respect to the NVS of the toner particles were added. The wax was a polyethylene wax, Acumist® B6, available from Honeywell.

In the resultant liquid toner composition, the percentage of resins is about 80%, the percentage of aluminum tri-stearate is about 1% and the percentage of pigment is about 18%, the percentage of charge director is about 0.1%, and the percentage of polyethylene wax is about 4.5%, all by weight of the NVS in the composition.

The resulting liquid toner compositions A, B, C and D (containing, respectively, toner particles A, B, C and D) were then tested for their transfer properties during an electrostatic printing process. The resulting liquid toner compositions A, B, C and D (containing, respectively, toner particles A, B, C and D). The durability of inks printed using the liquid toner compositions was also tested.

All of the experiments reported below were with toners containing about 18% pigment. The inventive concepts can be applied to other colored or uncolored toners as well.

The printing was carried out on an HP Indigo Press HP 7000, which utilizes a developer system such as that shown in U.S. Pat. No. 5,596,396 to Landa et al, and U.S. Pat. No. 5,610,694, to Lior et al, the disclosures of which is incorporated by reference. This press utilizes a heated intermediate transfer member having a blanket with a coating of a condensation type release layer as described in WO 96/11426, the disclosure of which is incorporated by reference.

The results are shown (except where indicated) for printing on Styrene Butadiene Rubber (SBR) coated acrylic substrates. The acrylic substrates were chosen since they are common and since adhesion to acrylic substrates is very poor. For other substrates tested the results are similar, but not identical and usually better.

Test for $1^{st}$ Transfer of Solids

The 1st transfer of solids from (from the PIP to the blanket) was evaluated qualitatively, looking through a lupa (magnifying glass) and visually evaluating the number of voids, that is ink-missing areas, on the blanket.

The qualitative results of this test are given in Table 1 below.

Test for $2^{nd}$ Transfer of Grays

Cycles of 900 impressions were printed with cleaner pages between them. Each cycle contained 3 consecutive jobs of 300 impressions each. Each page was divided into 3 printing zones. Each printing zone has a different aging history. FIG. 1 illustrates the zones printed on the pages in the three consecutive jobs.

In this test, the blanket temperature was 110° C. and the test was ended after 10K impressions.

Two main features were studied on the printed substrates:
1) Defects on grays and solid areas transfer as a function of the printing history
2) Dirtiness of the cleaner page The results of this test are given in Table 1.

Scratch Visibility Test

Inks printed onto a substrate using toner compositions A, B, C and D were measured for scratch resistance using a Taber Shear/Scratch Tester, Model 551, Mettler Toledo Microbalance, Model MT/UMT.

Generally, a moving test specimen was exposed to mechanical intrusion of a cutting tool at well defined conditions. The degree of the damage caused by the intrusion was assessed by weighing ink debris removed from the substrate. The method parameters used were as follows: a cutting tool of S-20 Tungsten Carbide, one rotation with 3 repetitions, 400% coverage, and a load of 50 g. Generally, two scratch tests were performed per image with two images tested. The results of this test are given in Table 2.

Peeling Test

Inks printed on a substrate using liquid toner compositions A, B, C and D were tested for adhesion to substrate using a 180° angle Peeling test. Generally, peeling tests evaluate adhesion of ink to substrate using pressure sensitive adhesive tape. Generally, a strip of adhesive tape is applied on heavy (>100%) coverage freshly printed images and then removed. Damage to the image characterizes the extent of adhesion between the image and the paper.

Specifically, the inks were evaluated using the following procedures. First, 6 copies of 100% ink coverage on various substrates were individually prepared for an individual 10 minute test. The 10 minute test refers to the present peel test that is performed 10 minutes after the ink is printed on the substrate. Six inches of standard adhesive tape (3 M 230, 1 inch wide) were placed over the printed ink and a standard (2 Kg Rubber covered) roller was rolled over the tape 5 times back and forth. Six printed images were tested. After, the appropriate time (10 minutes) the tape was removed and the resulting substrate was analyzed using specially designed software which measured the percentage of ink-free area created after removal of the ink from the substrate by the adhesive tape. Table 2 provides the results of 10 minute peel test for each ink. The results of this test are given in table 2.

Delta Gloss

Bare Paper Substrate Gloss is measured without the printed image, then 100% coverage image, printed on the same substrate type is measured. The delta between the two (printed being higher then unprinted) is then reported. The device used is BYK-Gardner, micro-gloss meter @ 75°.

Results

Table 1 below shows the transfer performance for the liquid toner compositions A, B and C.

TABLE 1

| Liquid toner composition | $2^{nd}$ transfer of grays | $1^{st}$ transfer of solids |
|---|---|---|
| A | bad | bad |
| B | good | bad |
| C | No failure | good |

Table 2 below provides the durability performance for the printed using Toner compositions A, B, C and D, with the results being given on the basis of performance compared to Toner composition A.

TABLE 2

| Test | Results for toner composition B (comparison with toner composition A) | Results for toner composition C (comparison with toner composition A) | Results for toner composition D (comparison with toner composition A) |
|---|---|---|---|
| Scratch visibility (PT) - coated print substrate* | ≤ | ≈ | ≈ |
| Peel test - uncoated print substrate* | < | ≈ | ≈ |
| Peel - coated print substrate* | < | ≈ | < |
| Delta Gloss - coated print substrate* | < | ≈ | ≈ |

*Coated print substrate indicates a Styrene Butadiene Rubber (SBR) coated acrylic substrate. Uncoated substrate indicates an uncoated acrylic substrate.

This methods used were qualitative paired tests, comparing each time a pair of inks tested to grade which is better. Thus e.g. if A> (better than) B and B>C, then A>C etc. In the above table: ≤ indicates a result that was slightly worse than the result for toner composition A; < indicates a result that was worse than the result for toner composition A; and ≈ indicates a result that was approximately the same as the result for toner composition A.

As can be seen above, embodiments of the present invention can produce very durable inks, while mitigating or avoiding some of the problems associated with toner compositions that contain highly acidic resins, but which do not contain an ester. While not being bound by theory, it is believed by the present inventors that esterification increases the compatibility of a resin with the hydrocarbon carrier liquid, producing a swollen resin with a longer retention of oil during the transfer processes. The higher oil content allows for a more moderate phase separation, and allows the ink to gradually conform to the paper surface. Accordingly, during the transfer processes, the resin-containing particles exhibit improved flow, while, after printing (and oil evaporation), a durable image is created. In addition, the high image-paper conformability allowed by increased ink flow is reflected on image adhesion benefits, in particular on uncoated media.

While the invention has been described with reference to certain embodiments, those skilled in the art will appreciate that various modifications, changes, omissions, and substitutions can be made without departing from the spirit of the disclosure. It is intended, therefore, that the invention be limited only by the scope of the following claims.

The invention claimed is:

1. A liquid toner composition comprising:
   (a) a carrier liquid;
   (b) particles comprising
      (i) a first component comprising a first polymer having acidic side groups that has an acidity of from 50 mg KOH/g to 110 mg KOH/g and a second polymer having acidic side groups that has an acidity of from 110 mg KOH/g to 130 mg KOH/g; and
      (ii) a second component comprising a polymer having ester side groups and acidic side groups, wherein A) the polymer having ester side groups and acidic side groups constitutes from 25% to 40% by weight of the total amount of the polymers of the first and second components; and
   (c) a charge director.

2. A liquid toner composition according to claim 1, wherein the polymer having ester side groups and acidic side groups is a co-polymer of a monomer having ester side groups, a monomer having acidic side groups, and a monomer absent of any acidic and ester side groups.

3. A liquid toner composition according to claim 1, wherein the polymer having ester side groups and acidic side groups is a co-polymer of (i) a first monomer having ester side groups selected from the group consisting of esterified acrylic acid and esterified methacrylic acid, (ii) a second monomer having acidic side groups selected from the group consisting of acrylic acid and methacrylic acid, and (iii) a third monomer which is an alkylene monomer selected from the group consisting of ethylene and propylene.

4. The liquid toner according to claim 3, wherein the first monomer having ester side groups is selected from the group consisting of an alkyl ester of acrylic acid and an alkyl ester of methacrylic acid.

5. A liquid toner composition according to claim 3, wherein the first monomer constitutes 5 to 15% by weight of the co-polymer, the second monomer constitutes 5 to 15% by weight of the co-polymer, with the third monomer constituting the remaining weight of the copolymer.

6. A liquid toner composition according to claim 1, wherein the first polymer having acidic side groups has an acidity of 80 mg KOH/g or more.

7. A liquid toner composition according to claim 1, wherein the first polymer having acidic side groups has an acidity of 100 mg KOH/g or more.

8. A liquid toner composition according to claim 1, wherein the first component comprises (i) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer; and (ii) a second polymer that is a copolymer of ethylene and an ethylenically unsaturated acid of either acrylic acid or methacrylic acid, wherein the ethylenically unsaturated acid of either acrylic or methacrylic acid constitutes from 16 wt % to about 20 wt % of the copolymer.

9. A method of producing the liquid toner composition of claim 1, the method comprising:
   combining the carrier liquid, the first component, the second component, and the charge director such that the liquid toner composition is formed.

10. A method of electrophotographic printing using the liquid toner composition of claim 1, the method comprising:
    forming a latent electrostatic image on a surface;
    contacting the surface with the liquid toner composition such that at least some of the particles adhere to the surface to form a developed toner image on the surface, and
    transferring the developed toner image to a print substrate.

11. A method according to claim 10, wherein the developed toner image is transferred from the surface to an intermediate transfer member, which is heated to a temperature of from 80 to 130° C., and then from the intermediate transfer member to the print substrate.

12. A liquid toner composition comprising:
    (a) a carrier liquid;
    (b) particles comprising
       (i) a first component comprising a first polymer having acidic side groups that has an acidity of from 50 mg KOH/g to 110 mg KOH/g and a second polymer having acidic side groups that has an acidity of from 110 mg KOH/g to 130 mg KOH/g; and
       (ii) a second component comprising a polymer having ester side groups and acidic side groups which is a copolymer of A) a first monomer having ester side groups selected from the group consisting of esterified acrylic acid and esterified methacrylic acid, B) a second monomer having acidic side groups selected from the group consisting of acrylic acid and methacrylic acid, and C) a third monomer which is an alkylene monomer selected from the group consisting of ethylene and propylene; and
    (c) a charge director.

13. The liquid toner according to claim 12, the first monomer having ester side groups is selected from the group consisting of an alkyl ester of acrylic acid and an alkyl ester of methacrylic acid.

14. A liquid toner composition according to claim 12, wherein the first monomer constitutes 5 to 15% by weight of the co-polymer, the second monomer constitutes 5 to 15% by weight of the co-polymer, with the third monomer constituting the remaining weight of the copolymer.

15. A liquid toner composition comprising:
    (a) a carrier liquid;
    (b) particles comprising
       (i) a first component comprising a first polymer having acidic side groups that has an acidity of from 50 mg KOH/g to 110 mg KOH/g and a second polymer having acidic side groups that has an acidity of from 110 mg KOH/g to 130 mg KOH/g, and wherein the first component comprises A) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer; and B) a second polymer that is a copolymer of ethylene and an ethylenically unsaturated acid of either acrylic acid or methacrylic acid, wherein the ethylenically unsaturated acid of either acrylic or methacrylic acid constitutes from 16 wt % to about 20 wt % of the copolymer; and
       (ii) a second component comprising a polymer having ester side groups and acidic side groups; and
    (c) a charge director.

16. A liquid toner composition comprising:
(a) a carrier liquid;
(b) particles comprising
   (i) a first component comprising a first polymer having acidic side groups that has an acidity of from 80 mg KOH/g to 110 mg KOH/g and a second polymer having acidic side groups that has an acidity of from 110 mg KOH/g to 130 mg KOH/g; and
   (ii) a second component comprising a polymer having ester side groups and acidic side groups; and
(c) a charge director.

17. A liquid toner composition according to claim 16, wherein the polymer having ester side groups and acidic side groups is a co-polymer of a monomer having ester side groups, a monomer having acidic side groups, and a monomer absent of any acidic and ester side groups.

18. A liquid toner composition according to claim 16, wherein the polymer having ester side groups and acidic side groups is a co-polymer of (i) a first monomer having ester side groups selected from the group consisting of esterified acrylic acid and esterified methacrylic acid, (ii) a second monomer having acidic side groups selected from the group consisting of acrylic acid and methacrylic acid, and (iii) a third monomer which is an alkylene monomer selected from the group consisting of ethylene and propylene.

19. The liquid toner according to claim 18, wherein the first monomer having ester side groups is selected from the group consisting of an alkyl ester of acrylic acid and an alkyl ester of methacrylic acid.

20. A liquid toner composition according to claim 18, wherein the first monomer constitutes 5 to 15% by weight of the co-polymer, the second monomer constitutes 5 to 15% by weight of the co-polymer, with the third monomer constituting the remaining weight of the copolymer.

21. A liquid toner composition according to claim 16, wherein the polymer having ester side groups and acidic side groups constitutes from 5% to 50% by weight of the total amount of the polymers of the first and second components.

22. A liquid toner composition according to claim 16, wherein the first polymer having acidic side groups has an acidity of 100 mg KOH/g to 110 mg/KOH/g.

23. A liquid toner composition according to claim 16, wherein the first component comprises (i) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer; and (ii) a second polymer that is a copolymer of ethylene and an ethylenically unsaturated acid of either acrylic acid or methacrylic acid, wherein the ethylenically unsaturated acid of either acrylic or methacrylic acid constitutes from 16 wt % to about 20 wt % of the copolymer.

24. A method of producing the liquid toner composition of claim 16, the method comprising:
   combining the carrier liquid, the first component, the second component, and the charge director such that the liquid toner composition is formed.

25. A method of electrophotographic printing using the liquid toner composition of claim 16, the method comprising:
   forming a latent electrostatic image on a surface;
   contacting the surface with the liquid toner composition such that at least some of the particles adhere to the surface to form a developed toner image on the surface, and
   transferring the developed toner image to a print substrate.

26. A method according to claim 25, wherein the developed toner image is transferred from the surface to an intermediate transfer member, which is heated to a temperature of from 80 to 130° C., and then from the intermediate transfer member to the print substrate.

* * * * *